United States Patent
Nishijima et al.

(10) Patent No.: US 6,691,248 B1
(45) Date of Patent: Feb. 10, 2004

(54) METHOD AND APPARATUS FOR CONTROLLING SUPPLY OF POWER, AND STORAGE MEDIUM

(75) Inventors: Kazuo Nishijima, Kawasaki (JP); Noboru Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 528 days.

(21) Appl. No.: 09/650,769

(22) Filed: Aug. 29, 2000

(30) Foreign Application Priority Data

Dec. 20, 1999 (JP) .......................................... 11-361526

(51) Int. Cl.[7] .............................................. G06F 11/00
(52) U.S. Cl. .......................................... 714/14; 714/22
(58) Field of Search .................... 714/14, 22; 713/340, 713/300, 310, 320

(56) References Cited

U.S. PATENT DOCUMENTS

| | | | |
|---|---|---|---|
| 5,381,554 A | * | 1/1995 | Langer et al. ................ 714/14 |
| 5,586,249 A | * | 12/1996 | Suzuki et al. ................ 714/13 |
| 5,835,780 A | * | 11/1998 | Osaki et al. ................ 713/300 |
| 6,191,500 B1 | * | 2/2001 | Toy ............................ 307/64 |

FOREIGN PATENT DOCUMENTS

| | | | | |
|---|---|---|---|---|
| JP | 57-79757 | 5/1982 | | |
| JP | 63-180117 | 7/1988 | | |
| JP | 09-322433 | 12/1997 | | |
| JP | 411299128 A | * | 10/1999 | ............. H02J/9/06 |

* cited by examiner

Primary Examiner—Scott Baderman
(74) Attorney, Agent, or Firm—Westerman, Hattori, Daniels & Adrian, LLP (57) ABSTRACT

An apparatus controls supply of power to an electronic device coupled thereto via one or a plurality of uninterrupted power supply units each receiving power from a corresponding external power source or including a battery unit. Each of the uninterrupted power supply units outputs power failure information when no power is received from the corresponding power source. The apparatus includes a first controller which controls input of power from the one or plurality of uninterrupted power supply units to the electronic device, and a second controller which controls the first controller in response to the power failure information received from at least one of the uninterrupted power supply units.

20 Claims, 9 Drawing Sheets

PRIOR ART

FIG. 1

PRIOR ART

| NO. | UNIT ID | FLG1 | POWER SUPPLY UNIT ID | UPS ID | FLG2 | PROCESSING LEVEL |
|-----|---------|------|----------------------|--------|------|------------------|
| 001 | EQ-01 | 1 | P-01 | UPS-01 | 1 | 2 |
| 002 | EQ-02 | 1 | P-02 | UPS-02 | 0 | 4 |
| 003 | EQ-03 | 0 | P-03 | UPS-01 | 1 | 3 |
| 004 | EQ-04 | 0 | P-04 | UPS-02 | 0 | 5 |
| | | | | UPS-01 | 1 | |
| | | | | UPS-02 | 0 | |

METHOD AND APPARATUS FOR CONTROLLING SUPPLY OF POWER, AND STORAGE MEDIUM

This application claims the benefit of a Japanese Patent Application No.11-361526 filed Dec. 20, 1999, in the Japanese Patent Office, the disclosure of which is hereby incorporated by reference.

BACKGROUND OF THE INVENTION

1. Field of the Invention

The present invention generally relates to methods and apparatuses for controlling supply of power and storage media, and more particularly to a power supply control apparatus and a power supply control method which control the supply of power to a computer system via an uninterrupted power supply (UPS), and to a computer-readable storage medium for causing a computer to control the supply of power by such a power supply control method.

2. Description of the Related Art

Conventionally, a power supply control apparatus controls the supply of power via an UPS to a computer system or the like when a power failure or a voltage drop occurs.

Figure 1:
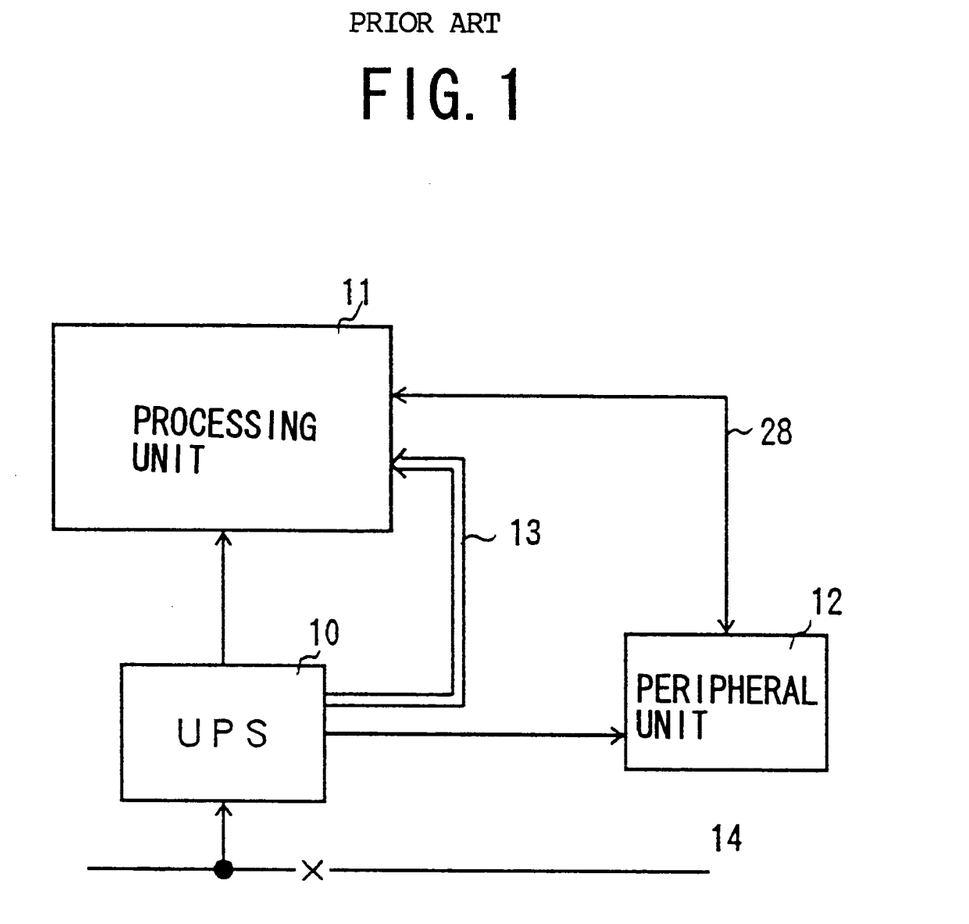
FIG. 1 is a system block diagram showing an example of a conventional power supply control apparatus.

FIG. 1 is a system block diagram showing an example of a conventional power supply control apparatus. A computer system shown in FIG. 1 includes an UPS 10, a processing unit 11, and a peripheral unit 12. The processing unit 11 forms the power supply control apparatus.

The UPS 10 is connected between the processing unit 11 and an A.C. power source 14. The UPS 10 detects a power failure when no power is received from the A.C. power source 14. When the power failure is detected, the UPS 10 supplies power from a battery unit thereof to the processing unit 11 and the peripheral unit 12.

The processing unit 11 is connected to the UPS 10 and the peripheral unit 12. The processing unit 11 and the UPS 10 are connected by an UPS interface 13. The processing unit 11 and the peripheral unit 12 are connected via a remote cabinet interface (RCI) 28. Information related to the supply of power to the peripheral unit 12 is notified to the processing unit 11 via the RCI 28.

The peripheral unit 12 is connected to the UPS 10 and the computer system 12, and the power is supplied to the peripheral unit 12 via the UPS 10.

For example, when a power failure occurs at a position indicated by "x" in FIG. 1, the UPS 10 detects that no power is supplied from the A.C. power source 14. When no power is supplied from the A.C. power source 14, the UPS 10 notifies information indicating the generation of a power failure to the processing unit 11 via the UPS interface 13. The processing unit 11 which is notified of the information continues to operate using the power supplied from the battery unit of the UPS 10. At the same time, the processing unit 11 receives power supply information from the peripheral unit 12 via the RCI 28.

The processing unit 11 which continues to operate using the power supplied from the battery unit of the UPS 10 monitors the UPS 10 until the power supply from the A.C. power source 14 is restored, within a monitoring time which is set depending on a power supply compensation time of the battery unit of the UPS 10. After the monitoring time elapses, the processing unit 11 carries out a process to normally stop the computer system, and also notifies to the peripheral unit 12 information indicating a disconnection of the power supply. When the peripheral unit 12 is notified of the information indicating the disconnection of the power supply from the processing unit 11, the power supply thereto is disconnected. The power supply to the processing unit 11 is disconnected when the processing unit 11 ends the process of normally stopping the system.

Accordingly, a backup power supply is made by the UPS 10 with respect to the processing unit 11 and the peripheral unit 12 when the power failure occurs, so that the system can be stopped normally.

Next, a description will be given of another example of the conventional power supply control apparatus which uses two power supply systems, by referring to FIG. 2.

Figure 2:
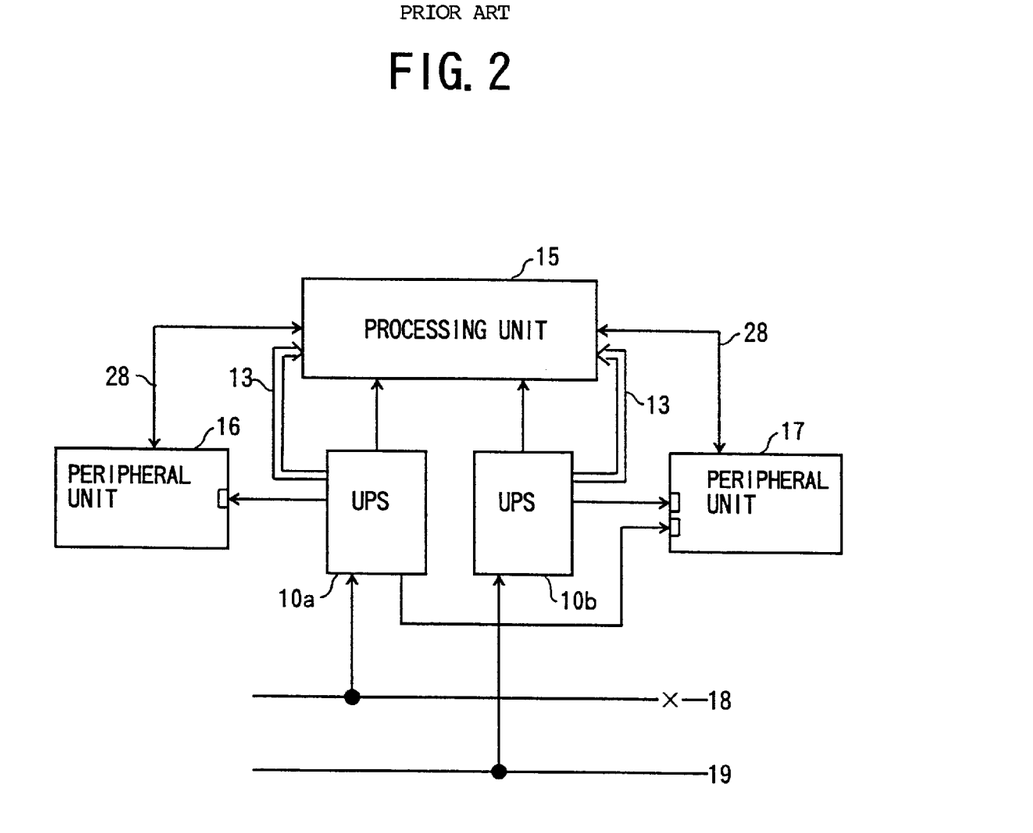
FIG. 2 is a system block diagram showing this other example of the conventional power supply control apparatus.

FIG. 2 is a system block diagram showing this other example of the conventional power supply control apparatus. In FIG. 2, those parts which are the same as those corresponding parts in FIG. 1 are designated by the same reference numerals, and a description thereof will be omitted. A computer system shown in FIG. 2 includes a processing unit 15, two UPSs 10a and 10b, and peripheral units 16 and 17.

The processing unit 15 is connected to the UPS 10a and the UPS 10b via the respective UPS interfaces 13. The processing unit 15 is also connected to the peripheral unit 16 and the peripheral unit 17 via the respective RCIs 28.

The UPS 10a is connected to an A.C. power source 18, and supplies power to the processing unit 15, the peripheral unit 16 and the peripheral unit 17. On the other hand, the UPS 10b is connected to a A.C. power source 19, and supplies power to the processing unit 15 and the peripheral unit 17.

The peripheral unit 16 receives the power from a single power supply system of the UPS 10a. The peripheral unit 17 receives the power from two power supply systems of the UPS 10a and the UPS 10b.

Accordingly, two UPSs 10a and 10b are provided in the computer system shown in FIG. 2, so as to cope with a unit which has a power receiving configuration to receive the power from a single power supply system and a unit which has a power receiving configuration to receive the power from two power supply systems. For example, when a power failure occurs at a position indicated by "x" in FIG. 2 and no power is supplied to the UPS 10a from the A.C. power source 18, the process to disconnect the power supply in the computer system is not carried out if the other UPS 10b is normal, and the power supply is continued in this case. In this state, the UPS 10a supplies the power from the battery unit thereof.

Figure 3:
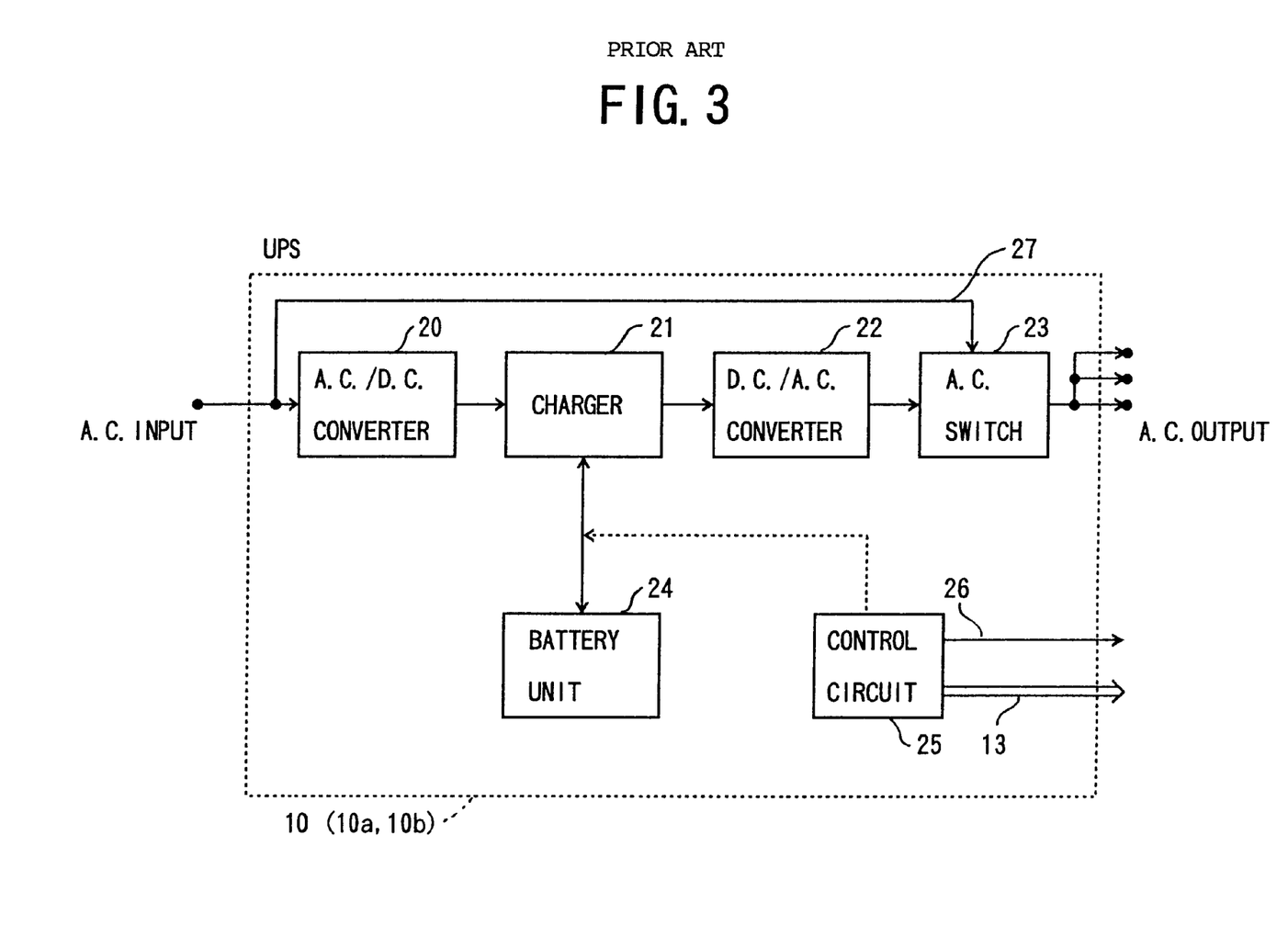
FIG. 3 is a system block diagram showing an example of the internal structure of an UPS.

Next, a description will be given of the internal structure of the UPS, by referring to FIG. 3. FIG. 3 is a system block diagram showing an example of the internal structure of the UPS 10, 10a or 10b.

In FIG. 3, when an A.C. voltage from an A.C. power supply is input to the UPS, the A.C. voltage is converted into a D.C. voltage by an A.C./D.C. converter 20. The D.C. voltage is supplied via a charger 21 to a D.C./A.C. converter 22 or a battery unit 24. When the D.C. voltage is supplied to the D.C./A.C. converter 22, the D.C. voltage is converted into an A.C. voltage. On the other hand, when the D.C. voltage is supplied to the battery unit 24, the battery unit 24 is charged thereby.

A control circuit 25 checks the voltage between the charger 21 and the battery unit 24, to determine whether or not the A.C. voltage input is normal and whether or not the power is supplied normally from the battery unit 24. When the control circuit 25 detects a power failure based on the D.C. voltage, the control circuit 25 notifies the processing unit 15, for example, via the UPS interface 13. In addition, the control circuit 25 supplies a power supply state indication 26 to a display panel (not shown) of the UPS, so as to display a message, turn on a indicator lamp or the like.

The A.C. voltage from the D.C./A.C. converter 22 is supplied to an external unit such as the peripheral unit 16 or 17, via an A.C. switch 23. Furthermore, when an abnormality is generated in the D.C./A.C. converter 22, the A.C. switch 23 supplies to the peripheral unit the A.C. voltage which is supplied to the A.C. switch 23 via a bypass circuit 27.

Therefore, the UPS 10, 10a or 10b charges the battery unit 24 so that the power can be supplied to the external unit from the battery unit 24 in case of a power failure or the like.

When the power failure occurs at a position indicated by "x" in the power supply control apparatus having two power supply systems as shown in FIG. 2, the power is supplied from the battery unit of the UPS 10a since no power is supplied from the A.C. power source 18. On the other hand, the UPS 10b supplies the power from the A.C. power source 19. In this state, the processing unit 15 continues to operate without carrying out a process to stop the system.

As a result, there is a problem in that, even though the power is supplied to the processing unit 15 from the A.C. power source 19, the power from the battery unit of the UPS 10a is also consumed.

SUMMARY OF THE INVENTION

Accordingly, it is a general object of the present invention is to provide a novel and useful power supply control apparatus, power supply control method and storage medium, in which the problem described above is eliminated.

Another and more specific object of the present invention is to provide a power supply control apparatus, a power supply control method and a computer-readable storage medium, which can efficiently cope with a power failure by effectively utilizing an UPS in an information processing system such as a computer system which includes at least one power supply system.

Another and more specific object of the present invention is to provide an apparatus for controlling supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, where the apparatus comprises a first controller controlling input of power from the one or plurality of uninterrupted power supply units to the electronic device, and a second controller controlling said first controller in response to the power failure information received from at least one of the uninterrupted power supply units. According to the apparatus of the present invention, it is possible to efficiently cope with a power failure by effectively utilizing the uninterrupted power supply units in an information processing system such as a computer system which includes at least one power supply system.

A further object of the present invention is to provide a method for controlling supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, where the method comprises the operation of controlling input of power from the one or plurality of uninterrupted power supply units to the electronic device in response to the power failure information received from at least one of the uninterrupted power supply units. According to the power supply control method of the present invention, it is possible to efficiently cope with a power failure by effectively utilizing the uninterrupted power supply units in an information processing system such as a computer system which includes at least one power supply system.

Another object of the present invention is to provide a computer-readable storage medium which stores a program for causing a computer to control supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, where the computer-readable storage medium comprises first means for causing the computer to control input of power from the one or plurality of uninterrupted power supply units to the electronic device, and second means for causing the computer to control said first means in response to the power failure information received from at least one of the uninterrupted power supply units. According to the computer-readable storage medium of the present invention, it is possible to efficiently cope with a power failure by effectively utilizing the uninterrupted power supply units in an information processing system such as a computer system which includes at least one power supply system.

Other objects and further features of the present invention will be apparent from the following detailed description when read in conjunction with the accompanying drawings.

DESCRIPTION OF THE PREFERRED EMBODIMENTS

Figure 4:
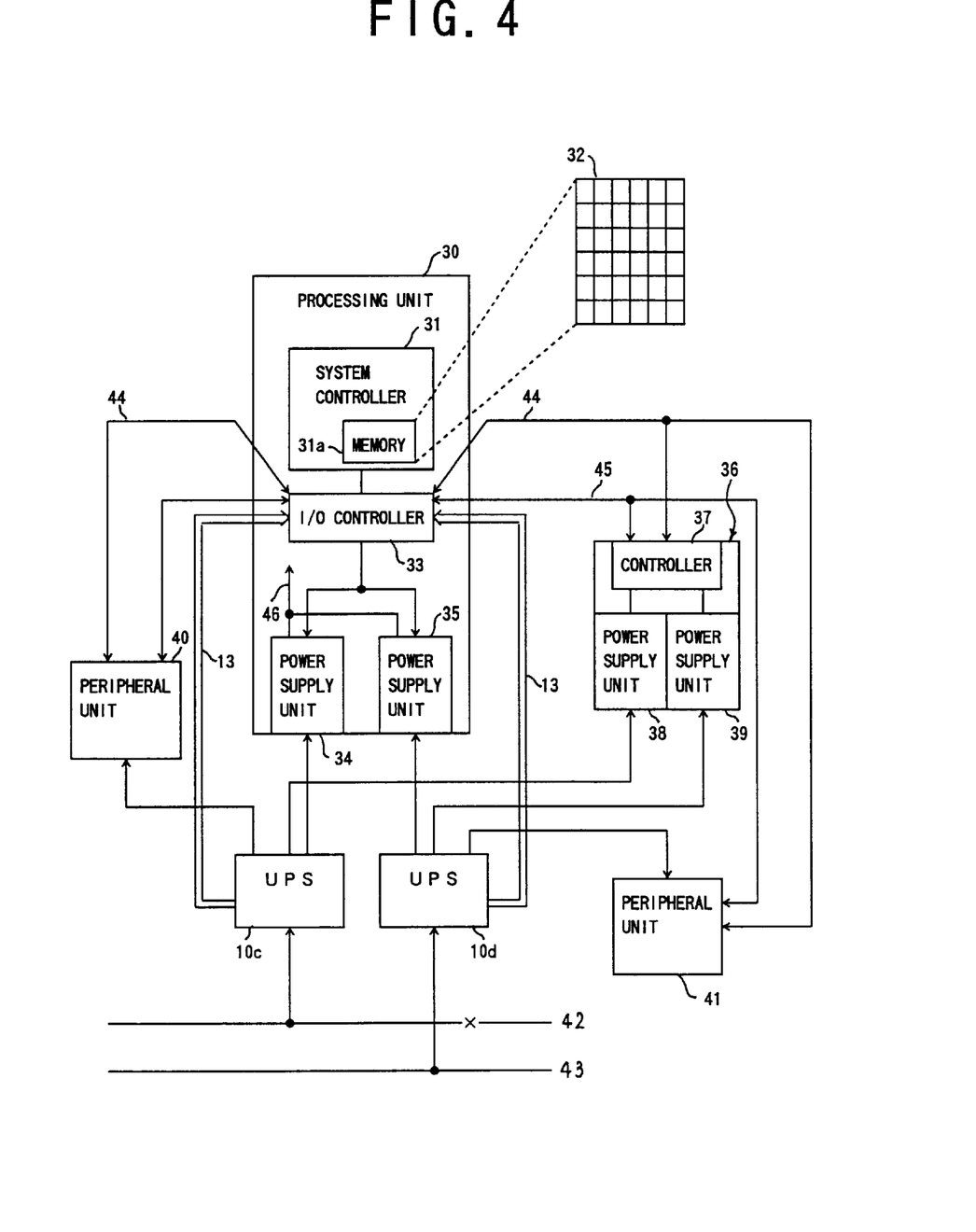
FIG. 4 is a system block diagram showing an embodiment of a power supply control apparatus according to the present invention.

FIG. 4 is a system block diagram showing an embodiment of a power supply control apparatus according to the present invention. This embodiment of the power supply control apparatus employs an embodiment of a power supply control method according to the present invention.

An information processing system, that is, a computer system shown in FIG. 4 includes a processing unit 30, a UPS 10c, a UPS 10d, and peripheral units 36, 40 and 41.

The processing unit 30 includes an system controller 31, an input/output (I/O) controller 33 which includes an UPS controller, and power supply units 34 and 35. In the processing unit 30, power supply voltages from the UPSs 10c and 10d are converted into a D.C. power supply voltage 46 by the power supply units 34 and 35, and the D.C. power supply voltage 46 is supplied to the I/O controller 33 and the system controller 31.

The I/O controller 33 controls the power received by, that is, input to, the processing unit 30 and the peripheral units 36, 40 and 41, based on power failure information from the UPSs 10c and 10d received via UPS interfaces 13, information received from the peripheral units 36, 40 and 41 via RCIs 45, and a UPS management table 32 which is stored in an internal memory 31a of the system controller 31. The peripheral units 36, 40 and 41 are also connected to the processing unit 30 via external interfaces 44.

The UPS 10c receives an A.C. power supply voltage from an external A.C. power source 42, and supplies power to the processing unit 30 and the peripheral units 36 and 40. On the other hand, the UPS 10d receives an A.C. power supply voltage from an A.C. power source 43, and supplies power to the processing unit 30 and the peripheral units 36 and 41.

The peripheral unit 36 has a power receiving configuration to receive power from two power supply systems, and includes a power supply unit 38, a power supply unit 39, and a controller 37. The power supply unit 38 receives the power from the UPS 10c, and the power supply unit 39 receives the power from the UPS 10d. The peripheral unit 40 has a power receiving configuration to receive power from a single power supply system, and receives the power from the UPS 10c. Similarly, the peripheral unit 41 has a power receiving configuration to receive power from a single power supply system, and receives the power from the UPS 10d.

For example, when a power failure occurs at a position indicated by "x" in FIG. 4, the UPS 10c notifies power failure information which indicates the generation of the power failure related to the A.C. power source 42 to the I/O controller 33 of the processing unit 30, via the UPS interface 13. The I/O controller 33 which is notified of the power failure information notifies the system controller 31 of the generated power failure related to the A.C. power source 42. In the processing unit 30, the power supply is controlled using the power failure information and the UPS management table 32, as will be described hereunder.

Figure 5:
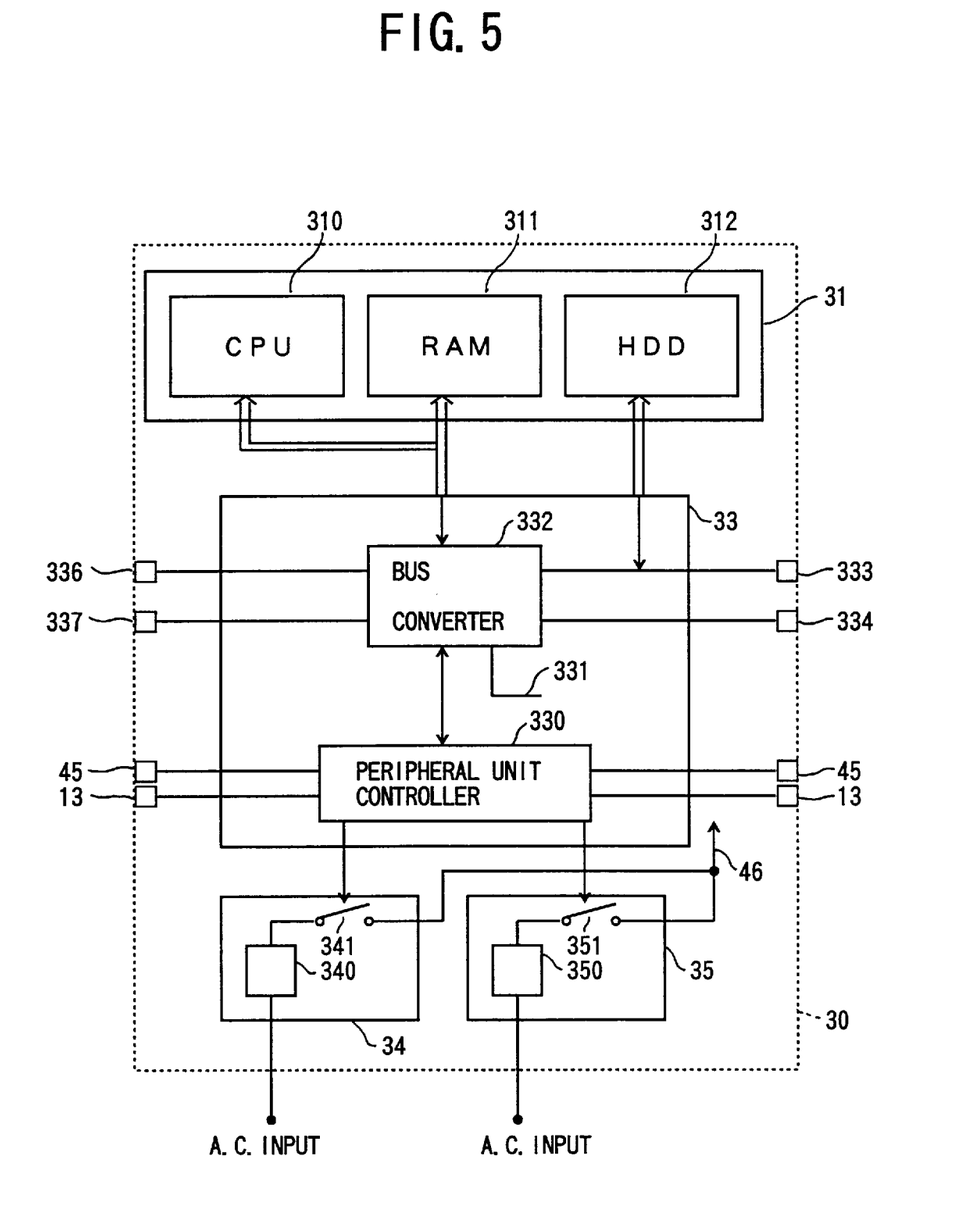
FIG. 5 is a system block diagram showing the internal structure of a computer system.

FIG. 5 is a system block diagram showing the internal structure of the processing unit 30. The processing unit 30 includes the system controller 31, the I/O controller 33, and the power supply units 34 and 35 which are connected as shown in FIG. 5.

The system controller 31 includes a CPU 310, a main storage 311 made of a RAM, for example, and an auxiliary storage 312 made of a hard disk drive (HDD), for example. The CPU 310, the main storage 311 and the auxiliary storage 312 are connected to the I/O controller 33 as shown. For example, the auxiliary storage 312 is used as the internal memory 31a which stores the UPS management table 32. In the system controller 31, the CPU 310 carries out a power supply control process based on the information received from the I/O controller 33 and control information included in the UPS management table 32 which is stored in the auxiliary storage 312, and notifies a result of the power supply control process to the I/O controller 33.

The I/O controller 33 includes a bus converter 332 and a peripheral unit controller 330. The bus converter 332 converts information which is input to and output from the system controller 31. More particularly, the bus converter 332 is connected to a LAN interface 336, a SCSI interface 333, a serial interface 337, and a parallel interface 334 which correspond to the external interfaces 44 shown in FIG. 4. The bus converter 332 supplies converted information to the peripheral unit controller 330 and a PCI bus 331 which is connected to the peripheral units 36, 40 and 41.

The peripheral unit controller 330 is connected to the UPS interface 13 and the RCI 45. The UPS interface 13 receives the power failure information from the UPSs 10c and 10d. The RCI 45 receives the power supply control or abnormality information from the peripheral units 36, 40 and 41.

Hence, the peripheral units 36, 40 and 41 are connected to the LAN interface 336, the SCSI interface 333, the serial interface 337, the parallel interface 334, and the RCI 45 and the UPS interface 13 which serve under the PCI bus 331.

The power supply unit 34 includes an A.C./D.C. converter 340 and a switch 341. Similarly, the power supply unit 35 includes an A.C./D.C. converter 350 and a switch 351. Each of the A.C./D.C. converters 340 and 350 converts the A.C. voltage received from the corresponding one of the A.C. power supplies 42 and 43 into the D.C. voltage 46. Each of the switches 341 and 351 is controlled by the peripheral unit controller 330 so as to enable or disable the supply the D.C. voltage 46 from the corresponding one of the A.C./D.C. converters 340 and 350 to the system controller 31 and the I/O controller 33. The power supply unit 34 is used as a primary power supply, and the power supply unit 35 is used as a secondary power supply. Normally, the power is supplied from the primary power supply, that is, the power supply unit 34.

The power supply units 38 and 39 of the peripheral unit 36 shown in FIG. 4 are constructed similarly to the power supply units 34 and 35 of the processing unit 30, and are controlled by the controller 37 similarly to the control carried out by the peripheral unit controller 330 of the processing unit 30. Furthermore, the peripheral units 40 and 41 respectively have a single power supply unit, which is constructed and controlled similarly to the power supply units 34, 35, 38 and 39 described above.

When the power failure occurs and the power is not received from the A.C. power source 42, the power supply is switched from the power supply unit 34 to the power supply unit 35. In this state, the peripheral unit controller 330 receives the power failure information from the UPS 10c, and supplies the power failure information to the system controller 31 via the bus converter 332. In the system controller 31, the CPU 310 carries out the power supply control process to control the power supply with respect to each of the peripheral units 36, 40 and 41, based on the information received via the I/O controller 33 and the information included in the UPS management table 32 which is stored in the auxiliary storage 312. The processed result of the power supply control process is stored in the primary storage 311.

Figure 6:
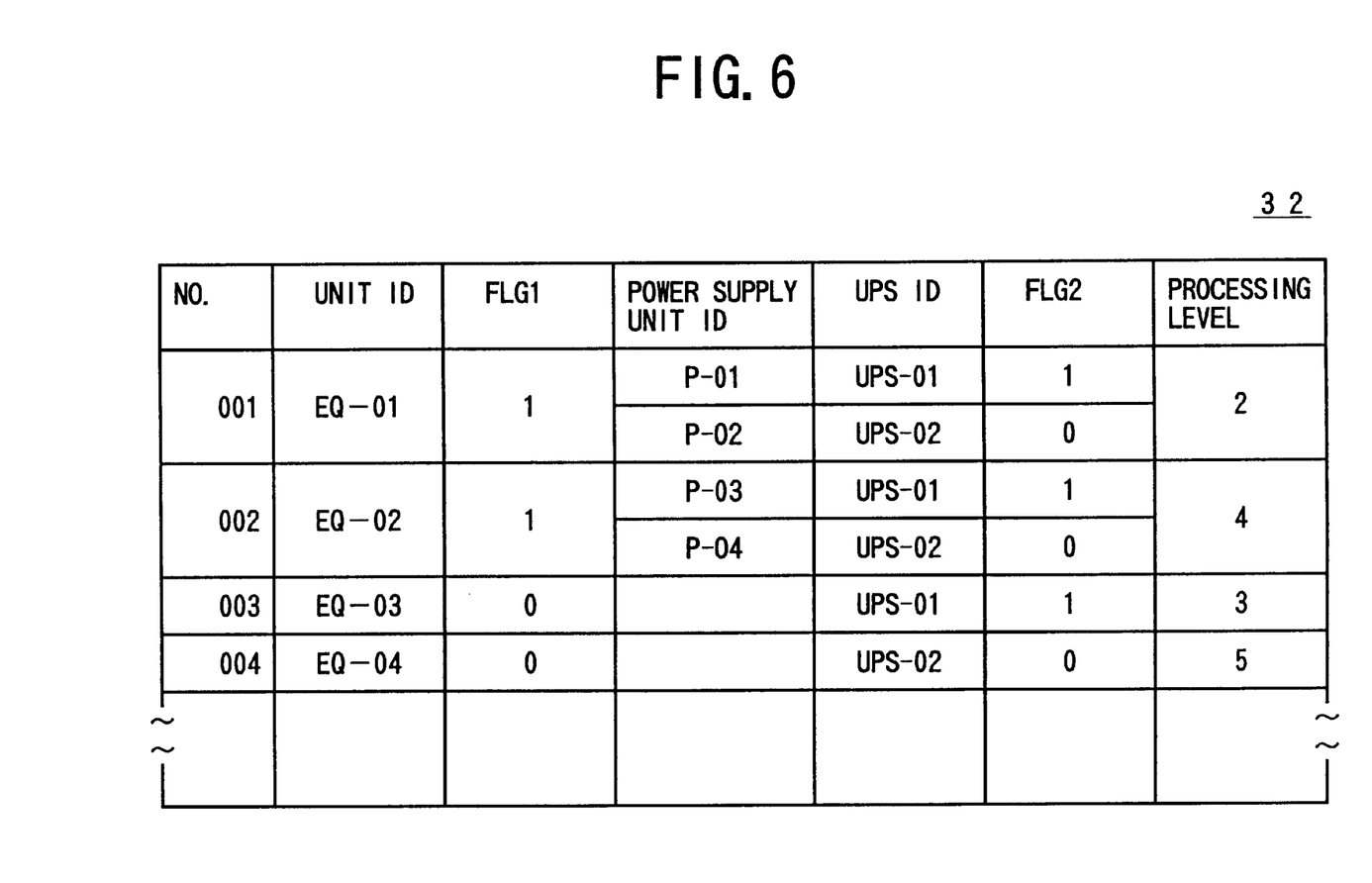
FIG. 6 is a diagram for explaining an UPS management table.

Next, a description will be given of the UPS management table 32 which is stored in the auxiliary storage 312, by referring to FIG. 6. FIG. 6 is a diagram for explaining the UPS management table 32. The UPS management table 32 includes information related to the power supply control process which is to be carried out with respect to each of the processing unit 30 and the peripheral units 36, 40 and 41 of the computer system shown in FIG. 4 when the power failure occurs.

In FIG. 6, the UPS management table 32 includes an item number NO., a unit ID, a power receiving configuration flag FLG1, a power supply ID, a UPS ID, a power failure flag FLG2, and a processing level. The item number NO. has an arbitrarily assigned serial number, but is not essential. The unit ID enables identification of the processing unit 30 and the peripheral units 36, 40 and 41. In this particular case, unit IDs EQ-01, EQ-02, EQ-03 and EQ-04 are respectively assigned to the processing unit 30 and the peripheral units 36, 40 and 41. The power receiving configuration flag FLG1 indicates whether or not the processing unit 30, the peripheral unit 36, 40 or 41 has the power receiving configuration to receive power from two power supply systems. The power receiving configuration flag FLG1 is set to "1" when the corresponding unit has the power receiving configuration to receive the power from two power supply systems.

The power supply ID enables identification of the power supply units 34, 35, 38 and 39 in case the power receiving configuration flag FLG1 is set. In this particular case, power supply IDs P-01, P-02, P-03 and P-04 are respectively assigned to the power supply units 34, 35, 38 and 39. The UPS ID enables identification of the UPSs 10c and 10d which are connected to the corresponding one of the processing unit 30 and the peripheral units 36, 40 and 41. In this particular case, UPS IDs UPS-01 and UPS-02 are respectively assigned to the UPSs 10c and 10d. The power failure flag FLG2 indicates whether or not a power failure has occurred in a power supply system (or path) which includes the corresponding one of the UPSs 10c and 10d. Further, the processing level indicates a level of the power supply control process carried out by the corresponding one of the processing unit 30 and the peripheral units 36, 40 and 41 in case of a power failure. The processing level instructs the power supply control process to be carried out during the power failure process.

For the power failure process, the processing level "1" of the power supply control process stops each of the peripheral units 36, 40 and 41 from receiving the power from the UPSs 10c and 10d, and stops the processing unit 30 from receiving the power from the UPSs 10c and 10d, so as to shut down the computer system. The processing level "2" of the power supply control process stops the processing unit 30 from receiving the power from the UPS 10c or 10d included in the power supply system in which the power failure is generated. The processing level "3" of the power supply control process stops the peripheral unit 36, 40 or 41 from receiving the power from the UPSs 10c and 10d responsive to the shut-down process of the processing unit 30. The processing level "4" of the power supply control process stops the peripheral unit 36, 40 or 41 from receiving the power from the UPSs 10c or 10d included in the power supply system in which the power failure is generated. Furthermore, the processing level "5" of the power supply control process stops the peripheral unit 36, 40 or 41 from receiving the power from the UPSs 10c and 10d immediately when the power failure occurs.

For example, for the item number No. "002", the unit ID is EQ-02 which indicates the peripheral unit 36. For this unit ID EQ-02, the power receiving configuration flag FLG1 is set, and the power supply IDs are P-01 and P-02 which indicate the power supply units 34 and 35. The USP IDs corresponding to the power supply IDs P-01 and P-02 respectively are UPS-01 and UPS-02. The power failure flag FLG2 is set with respect to the UPS-ID UPS-01, indicating that the power failure occurred in the power supply system which includes the UPS 10c. In this case, the processing level is set to "4" with respect to the peripheral unit 36.

Accordingly, it is possible to arbitrarily determine the power supply control process which is to be carried out with respect to the units of the computer system, by appropriately setting the information included in the UPS management table 32. The information in the UPS management table 32 may be preset in advance, set by the user, or optimized by use of a special interface.

Figure 7:
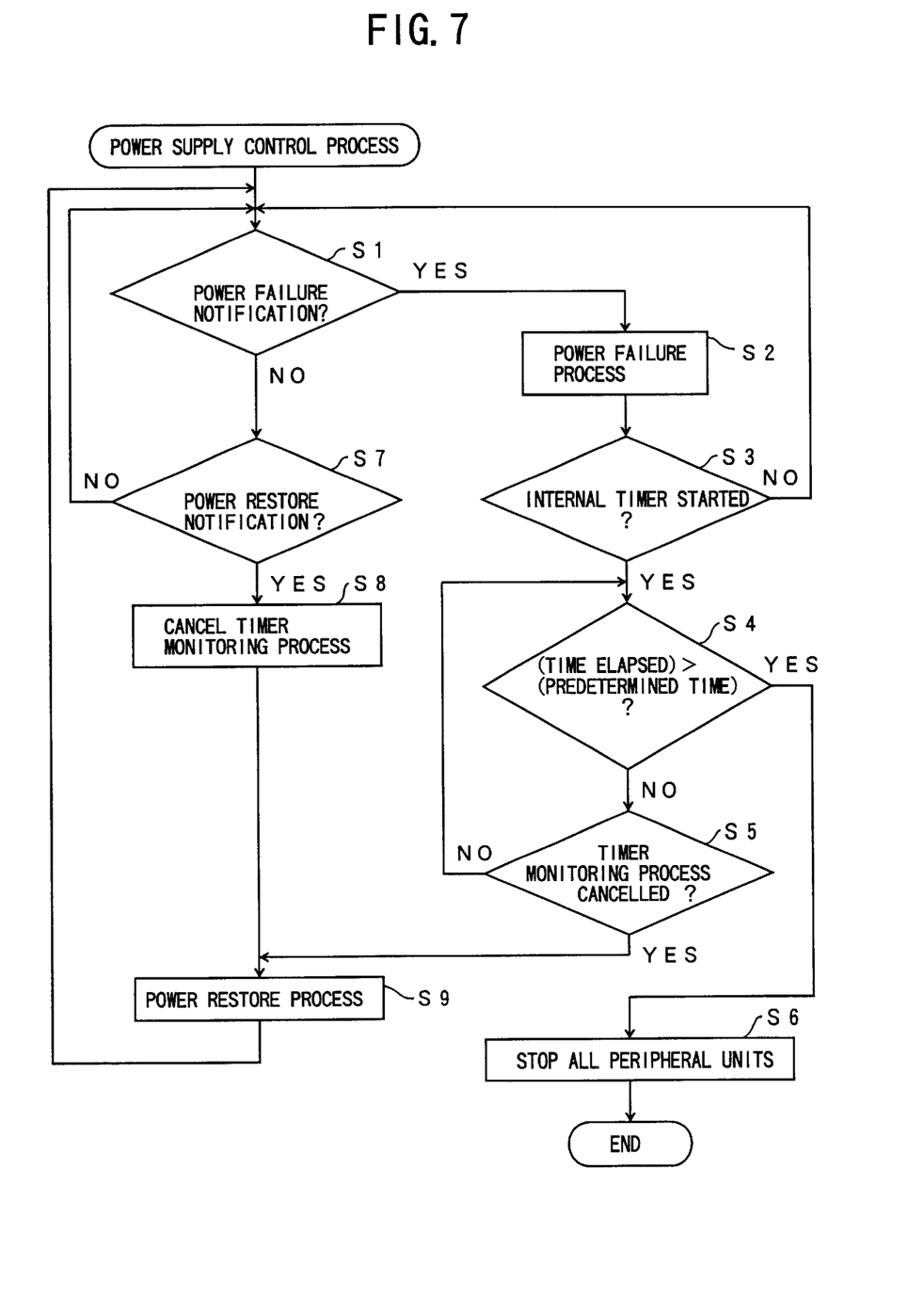
FIG. 7 is a flow chart for explaining a power supply control process.

Next, a description will be given of the power supply control process, by referring to FIG. 7. FIG. 7 is a flow chart for explaining the power supply control process which is carried out by the processing unit 30.

In FIG. 7, a step S1 decides, in the I/O controller 33, whether or not a power failure notification (power failure information) is received from the UPS interface 13. If the decision result in the step S1 is YES, a step S2 carries out a power failure process which will be described later in conjunction with FIG. 8.

After the step S2, a step S3 decides whether or not an internal timer of the system controller 31 is started. This internal timer is used to start a shut-down process during the power failure process. The process returns to the step S1 if the decision result in the step S3 is NO. If the decision result in the step S3 is YES, a step S4 decides whether or not a time elapsed and measured by the internal timer is greater than a predetermined set time until the start of the shut-down. If the decision result in the step S4 is YES, a step S6 stops all of the peripheral units 36, 40 and 41 from receiving the supply of power and carries out a shut-down process with respect to the processing unit 30 to stop the processing unit 30 from receiving the supply of power, and the power supply control process ends. As a result, the computer system stops receiving the supply of power and is shut down.

On the other hand, if the decision result in the step S4 is NO, a step S5 decides whether or not a timer monitoring process for monitoring the internal timer is cancelled. The process returns to the step S4 if the decision result in the step S5 is NO. If the decision result in the step S5 is YES, a step S9 carries out a power restore process which will be described later in conjunction with FIG. 9, and the process returns to the step S1.

On the other hand, the decision result in the step S1 is NO in a normal state where no power failure is generated, in a state where the power is to be restored after the power failure, and in a state where the I/O controller 33 receives no power restore notification. If the decision result in the step S1 is NO, a step S7 decides whether or not a power restore notification (power restore information) is received via the UPS interface 13, and the process returns to the step S1 if the decision result in the step S7 is NO. Normally, the I/O controller 33 receives no power restore notification, and thus, the processes of the steps S1 and S7 are repeated.

If the decision result in the step S7 is YES, a step S8 cancels the timer monitoring process with respect to the internal timer, and the process advances to the step S9 described above.

Accordingly, by carrying out above described shut-down process at the time of the power failure and the power restore process to restore the power, it is possible to protect the data stored in the processing unit 30 and the peripheral units 36, 40 and 41, and to efficiently control the supply of power to the processing unit 30 and the peripheral units 36, 40 and 41.

Next, a description will be given of the power failure process of the step S2 and the power restore process of the step S9, by referring to FIGS. 8 and 9. The processes of the steps S2 and S9 are carried out based on the UPS management table 32 which is stored in the auxiliary storage 312 of the system controller 31.

Figure 8:
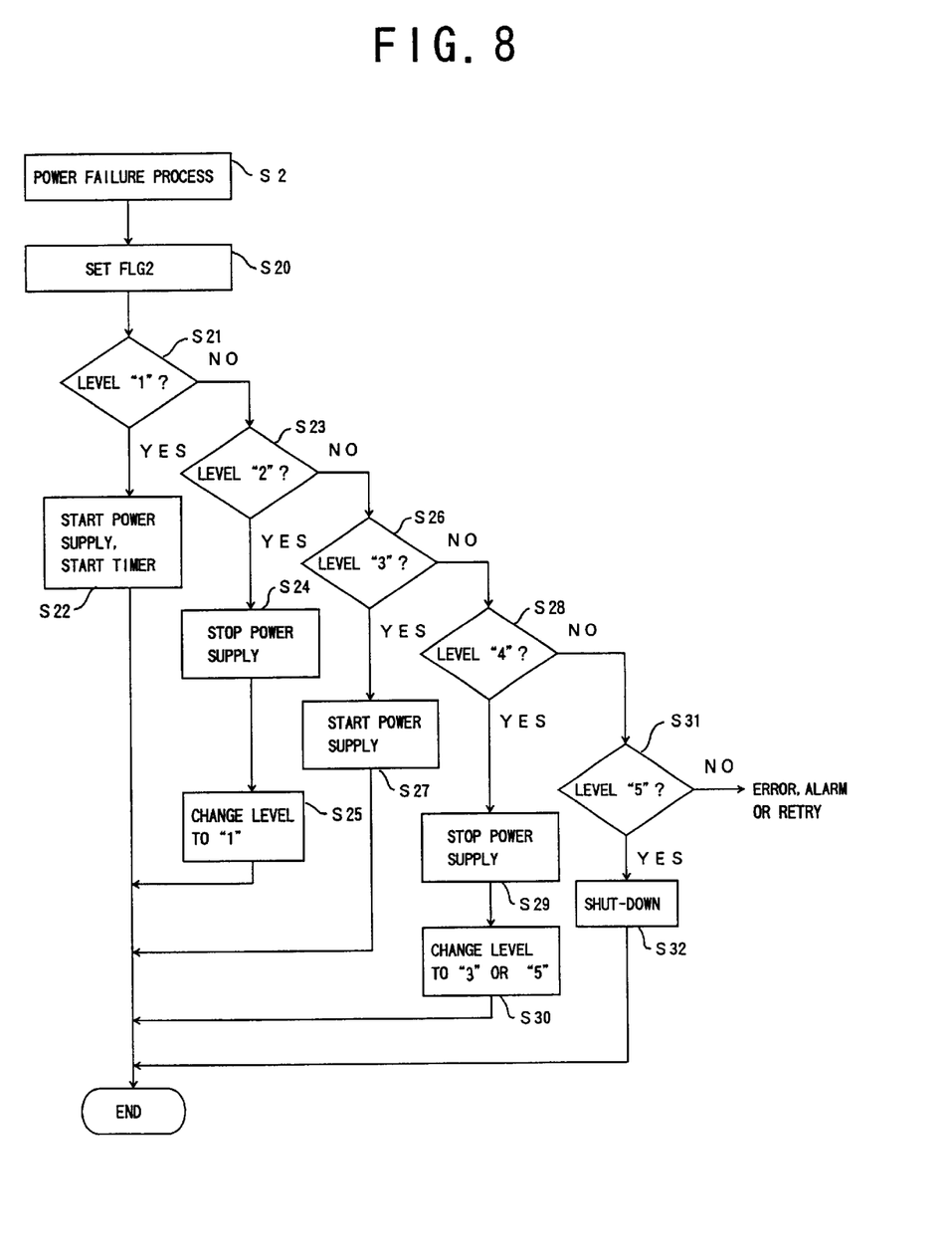
FIG. 8 is a flow chart for explaining a power failure process.

FIG. 8 is a flow chart for explaining the power failure process of the step S2. The power failure process shown in FIG. 8 is carried out with respect to each of the units 30, 36, 40 and 41 when the power failure is generated. First, a step S20 sets the power failure flag FLG2 to "1" with respect to the UPS 10c or 10d which is included in the power supply system in which the power failure is generated, for corresponding power supply units of the units 30, 36, 41 and 41. Then, steps S21, S23, S26, S28 and S31 are carried out to judge the processing level corresponding to the UPS 10c or 10d having the UPS ID with respect to which the power failure flag FLG2 is set in the UPS management table 32 shown in FIG. 6.

The step S21 decides whether or not the processing level is "1". If the decision result in the step S21 is YES and the power receiving configuration flag FLG1 is "1", the power failure is generated in one of the two power supply systems from which the unit can receive the power, and the supply of power from one of the power supply systems via the UPS 10c or 10d is stopped. Hence, if the decision result in the step S21 is YES and the power receiving configuration flag FLG1 is "1", that is, in the processing level "1" of the power failure process, a step S22 starts the supply of power from the UPS 10c or 10d which is included in the stopped power supply system by controlling the corresponding power supply unit, and starts the internal timer which is used to start the shut-down process. The power failure process ends after the step S22. Accordingly, the unit 30 or 36 which is set to the processing level "1" receives the power supply from the two UPSs 10c and 10d, and the wear of the battery units within the UPSs 10c and 10d can be averaged, thereby enabling an efficient power supply control process.

If the decision result in the step S21 is NO, the step S23 decides whether or not the processing level is "2". If the decision result in the step S23 is YES and the power receiving configuration flag FLG1 is "1", a step S24 stops the supply of power from the UPS 10c or 10d which is included in the power supply system in which the power failure is generated by controlling the corresponding power supply unit. In addition, a step S25 changes the processing level to "1" in the UPS management table 32, and the power failure process ends. Hence, it is possible to suppress unnecessary wear of the battery unit of the UPSs 10c or 10d which is included in the stopped power supply system, by stopping the power supply via the UPS 10c or 10d to the units 30 or 36.

If the decision result in the step S23 is NO, the step S26 decides whether or not the processing level is "3". If the decision result in the step S26 is YES and the power receiving configuration flag FLGL is "1", a step S27 starts the stopped power supply system by controlling the corresponding power supply unit, and the power failure process ends. Thus, the unit 30 or 36 which has the power receiving configuration to receive the power from two power supply systems and is set to the processing level "3" receives the supply of power from the two UPSs 10c and 10d, and the wear of the battery units within the UPSs 10c and 10d can be averaged, thereby enabling an efficient power supply control process. On the other hand, if the decision result in the step S26 is YES and the power receiving configuration flag FLG1 is "0", the unit 40 or 41 which has the power receiving configuration to receive the power from a single power supply system and is set to the processing level "3" is allowed to continuously receive the supply of power from the battery unit of the UPS 10c or 10d included in the power supply system in which the power failure is generated.

On the other hand, if the decision result in the step S26 is NO, the step S28 decides whether or not the processing level is "4". If the decision result in the step S28 is YES, a step S29 stops the supply of power from the UPS 10c or 10d which is included in the power supply system in which the power failure is generated by controlling the corresponding power supply unit. In addition, a step S30 changes the processing level to "3" or "5" in the UPS management table 32, and the power failure process ends. Hence, it is possible to suppress unnecessary wear of the battery units of the UPSs 10c and 10d by stopping the power supply via the UPS 10c or 10d.

Furthermore, if the decision result in the step S28 is NO, the step S31 decides whether or not the processing level is "5". If the decision result in the step S31 is YES and the power receiving configuration flag FLG1 is "0", a step S32 carries out a shut-down process to shut down the power supply, that is, stopping to receive the supply of power via the UPSs 10c and 10d, by controlling all of the power supply units, and the power failure process ends. By immediately shutting down the power supply in the case of the processing level "5", it is possible to suppress the unnecessary wear of the battery units within the UPSs 10c and 10d.

If the decision result in the step S31 is NO, it is possible to output an error message, output an alarm, return to the step S20 to retry the power failure process, or the like.

Next, a description will be given of the power restore process of the step S9 shown in FIG. 7, by referring to FIG. 9.

Figure 9:
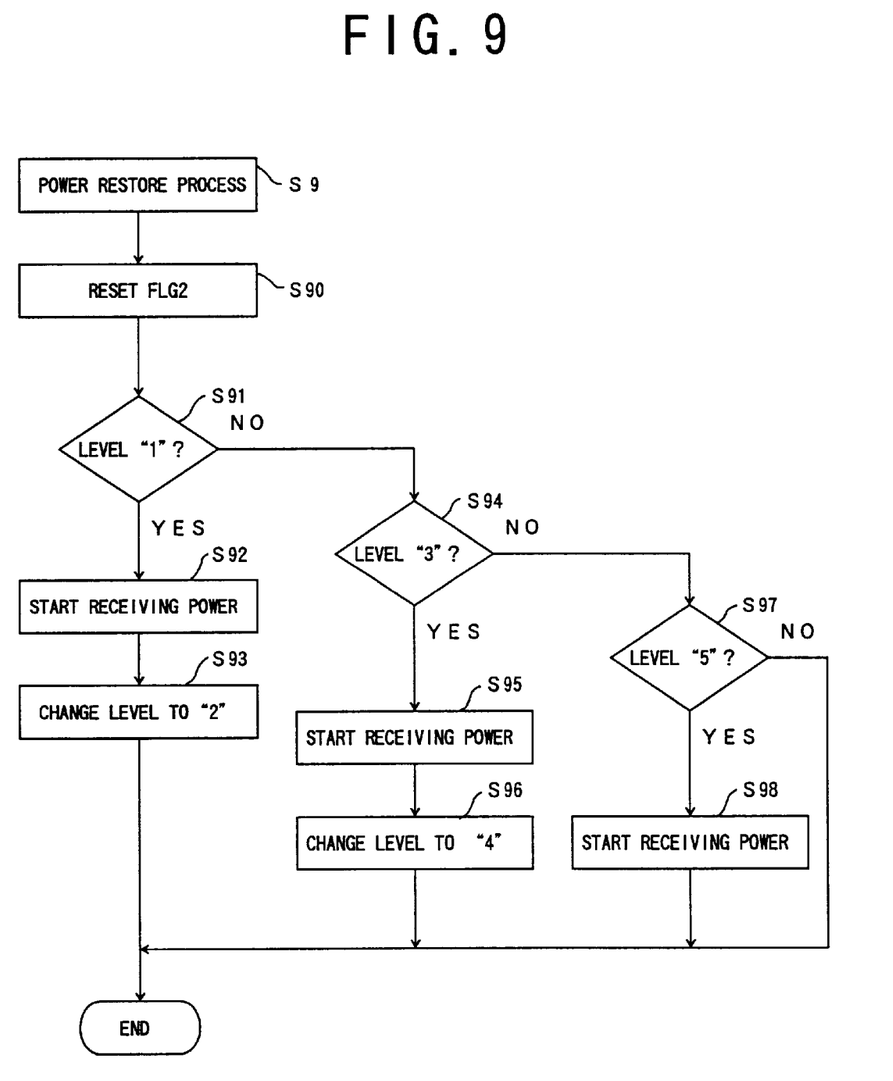
FIG. 9 is a flow chart for explaining a power restore process.

FIG. 9 is a flow chart for explaining the power restore process of the step S9. The power restore process shown in FIG. 9 is carried out is carried out with respect to each of the units 30, 36, 40 and 41 when the power failure ends, that is, when the power restore notification (power restore information) is received from the UPS 10c or 10d. First, a step S90 resets the power failure flag FLG2 corresponding to the UPS 10c or 10d which belongs to the power supply system in which the power failure is generated from "1" to "0". Thereafter, steps S91, S94 and S97 are carried out to determine the processing level corresponding to the UPS 10c or 10d having the UPS ID with respect to which the power failure flag FLG2 is reset in the UPS management table 32 shown in FIG. 6.

First, the step S91 decides whether or not the processing level is "1". If the decision result in the step S91 is YES, a step S92 starts receiving the supply of power from the UPS 10c or 10d which is included in the power supply system in which the power failure is restored, by controlling the corresponding power supply unit. After this step S92 ends, a step S93 changes the processing level to "2" in the UPS management table 32, and the power restore process ends.

On the other hand, if the decision result in the step S91 is NO, the step S94 decides whether or not the processing level is "3". If the decision result in the step S94 is YES and the power receiving configuration flag FLG1 is n"1", a step S95 starts receiving the supply of power from the UPS 10c or 10d which is included in the power supply system in which the power failure is restored, by controlling the corresponding power supply unit. After this step S95 ends, a step S96 changes the processing level to "4" in the UPS management table 32, and the power restore process ends.

Moreover, if the decision result in the step S94 is NO, the step S97 decides whether or not the processing level is "5".

If the decision result in the step S97 is YES, a step S98 starts receiving the supply of power from the UPS 10c or 10d which is included in the power supply system in which the power failure is restored, by controlling the corresponding power supply unit so as to supply the power to the peripheral unit 36, 40 or 41 which was stopped from receiving the supply of power. The process ends if the decision result in the step S97 is NO or after the step S98.

Therefore, the I/O controller 33 monitors the power failure information from the UPSs 10c and 10d, and notifies the power failure information to the system controller 31 so as to carry out the power failure process described above. In addition, the I/O controller 33 monitors the power restore information from the UPSs 10c and 10d, and notifies the power restore information to the system controller 31 so as to carry out the power restore process described above.

Next, a description will be given of the power failure process which is carried out in the step S2 shown in FIG. 7 for a particular case, by referring to FIGS. 4 and 6. In this particular case, it is assumed for the sake of convenience that a power failure is generated in the power supply system which includes the A.C. power source 42 and the UPS 10c, at the position indicated by "x" in FIG. 4. In addition, it is assumed for the sake of convenience that the step S2 shown in FIG. 7 carries out the power failure process shown in FIG. 8 when the processing unit 30 receives the power failure notification (power failure information) from the UPS 10c having the UPS ID UPS-01 and belonging to the power supply system in which the power failure is generated.

The following power failure process PFP1 is carried out when the power failure is generated at the position indicated by "x" in FIG. 4.

Power Failure Process PFP1

First, the step S20 shown in FIG. 8 sets the power failure flag FLG2 to "1" with respect to each power supply unit of the units which receive the power from the UPS 10c having the UPS ID UPS-01 belonging to the power supply system in which the power failure is generated, in the UPS management table 32 shown in FIG. 6. The units which receive the power from the UPS 10c having the UPS ID UPS-01 and belonging to the power supply system in which the power failure is generated, include the processing unit 30 having the unit ID EQ-01, the peripheral unit 36 having the unit ID EQ-02, and the peripheral unit 40 having the unit ID EQ-03. Accordingly, the power failure flag FLG2 corresponding to the UPS ID UPS-01 in the UPS management table 32 is set to "1" with respect to the power supply unit 34 having the power supply ID P-01 within the processing unit 30 having the unit ID EQ-01, the power supply unit 38 having the power supply ID P-03 within the peripheral unit 36 having the unit ID EQ-02, and the power supply unit within the peripheral unit 40 having the unit ID EQ-03. Thereafter, the steps S21, S23, S26, S28 and S31 are carried out to determine the processing levels of the processing unit 30 having the unit ID EQ-01, the peripheral unit 36 having the unit ID EQ-02, and the peripheral unit 40 having the unit ID EQ-03 which are related to the generated power failure.

Since the processing level of the processing unit 30 having the unit ID EQ-01 is "2", the steps S24 and S25 shown in FIG. 8 are carried out. More particularly, the step S24 stops the power supply unit 34 which has the power supply ID P-01 from receiving the power from the UPS 10c belonging to the power supply system in which the power failure is generated. In addition, after the supply of power from the power supply unit 34 is stopped, the step S25 changes the processing level of the processing unit 30 having the unit ID EQ-01 to "1", since the processing unit 30 in this state only receives the power from one power supply system which includes the UPS 10d. Hence, the processing level "2" of the power control process can stop the supply of power via the UPS 10c which is connected to the power supply system in which the power failure is generated, so as to suppress wear of the battery unit within this UPS 10c.

In addition, because the processing level of the peripheral unit 36 having the unit ID EQ-02 is "4", the steps S29 and S30 are carried out. More particularly, the step S29 stops the power supply unit 38 which has the power supply ID P-03 from receiving power from the UPS 10c belonging to the power supply system in which the power failure is generated. In addition, after the supply of power from the power supply unit 38 is stopped, the step S30 changes the processing level of the peripheral unit 36 having the unit ID EQ-02 to "3", since the peripheral unit 36 in this state only receives the power from one power supply system which includes the UPS 10d. Hence, the processing level "4" of the power control process can stop the supply of power via the UPS 10c which is connected to the power supply system in which the power failure is generated, so as to suppress wear of the battery unit within this UPS 10c.

Since the processing level of the peripheral unit 40 having the unit ID EQ-03 is "3", the step S27 is carried out. More particularly, the step S27 permits the power supply unit of the peripheral unit 40 to continue receiving the power from the battery unit of the UPS 10c, since the peripheral unit 40 only receives the power from the UPS 10c.

When the I/O controller 33 receives the power failure information from the UPS 10d in this state, the following power failure process PFP2 is carried out.

On the other hand, when the I/O controller 33 receives the power restore information from the UPS 10d in this state, a power restore process PRP1 to be described later is carried out.

Power Failure Process PFP2

First, the step S20 sets the power failure flag FLG2 to "1" with respect to each power supply unit of the units which receive the power from the UPS 10d having the UPS ID UPS-02 belonging to the power supply system in which the power failure is generated, in the UPS management table 32 shown in FIG. 6. The units which receive the power from the UPS 10d having the UPS ID UPS-02 and belonging to the power supply system in which the power failure is generated, include the processing unit 30 having the unit ID EQ-01, the peripheral unit 36 having the unit ID EQ-02, and the peripheral unit 41 having the unit ID EQ-04. Accordingly, the power failure flag FLG2 corresponding to the UPS ID UPS-02 in the UPS management table 32 is set to "1" with respect to the power supply unit 35 having the power supply ID P-02 within the processing unit 30 having the unit ID EQ-01, the power supply unit 39 having the power supply ID P-04 within the peripheral unit 36 having the unit ID EQ-02, and the power supply unit within the peripheral unit 41 having the unit ID EQ-04. Thereafter, the steps S21, S23, S26, S28 and S31 are carried out to determine the processing levels of the processing unit 30 having the unit ID EQ-01, the peripheral unit 36 having the unit ID EQ-02, and the peripheral unit 41 having the unit ID EQ-04 which are related to the generated power failure.

Since the processing level of the processing unit 30 having the unit ID EQ-01 is "1" in this state, the step S22 is carried out. More particularly, the step S22 makes the power supply unit 34 which has the power supply ID P-01 start receiving the power from the UPS 10c belonging to the power supply system in which the power failure is generated. At the same time, the internal timer is started to start the shut-down process. Therefore, the processing unit 30 in this state receives the power from the battery unit of the UPS 10c and the power from the battery unit of the UPS 10d, so that the wear of the battery units of the UPSs 10c and 10d can be averaged.

In addition, because the processing level of the peripheral unit 36 having the unit ID EQ-02 is "3" in this state, the step S27 is carried out. More particularly, the step S27 makes the power supply unit 38 which has the power supply ID P-03 start receiving power from the UPS 10c belonging to the power supply system in which the power failure is generated. Accordingly, the peripheral unit 36 in this state receives the power from the battery unit of the UPS 10c and the power from the battery unit of the UPS 10d, so that the wear of the battery units of the UPSs 10c and 10d can be averaged.

Since the processing level of the peripheral unit 41 having the unit ID EQ-04 is "5" in this state, the step S32 is carried out. More particularly, the step S32 immediately stops the power supply unit of the peripheral unit 41 from receiving the power from the UPS 10d, so as to avoid unnecessary wear of the battery unit of the UPS 10d.

When the internal timer used to start the shut-down process measures the lapse of time exceeding the predetermined set time, the shut-down process of the step S6 shown in FIG. 7 is carried out.

On the other hand, when the I/O controller 33 receives the power restore information from the UPS 10d in this state, a power restore process PFP2 to be described later is carried out.

Power Restore Process PRP1

In this particular case, the power failure flag FLG2 of the UPS 10c having the UPS ID UPS-01 is reset to "0" in the UPS management table 32 shown in FIG. 6, and the following power restore process is carried out with respect to the units 30, 36 and 40 which receive the power from the UPS 10c.

Because the processing level of the processing unit 30 having the unit ID EQ-01 is "1", the steps S92 and S93 shown in FIG. 9 are carried out. More particularly, the step S92 makes the power supply unit 34 start receiving the power from the UPS 10c, and the step S93 changes the processing level to "2".

Since the processing level of the peripheral unit 36 having the unit ID EQ-02 is "3" and the corresponding power receiving configuration flag FLG1 is "1", the steps S95 and S96 are carried out. More particularly, the step S95 makes the power supply unit 38 start receiving the power from the UPS 10c, and the step S96 changes the processing level to "4".

On the other hand, the processing level of the peripheral unit 40 having the unit ID EQ-03 is "3" and the corresponding power receiving configuration flag FLG1 is "0". Hence, the decision result in the step S94 is NO, and no control is carried out with respect to the power supply unit of the peripheral unit 40.

Power Restore Process PRP2

In this particular case, the internal timer used to start the shut-down process is reset, that is, the timer monitoring process is cancelled. If it is assumed for the sake of convenience that the power failure in the power supply system including the UPS 10d is restored, the corresponding power failure flag FLG2 is reset to "0", and the following power restore process is carried out with respect to the units 30, 36 and 41 which receive the power from the UPS 10d.

Because the processing level of the processing unit 30 having the unit ID EQ-01 is "1", the steps S92 and S93 shown in FIG. 9 are carried out. More particularly, the step S92 makes the power supply unit 35 start receiving the power from the UPS 10d, and the step S93 changes the processing level to "2".

Since the processing level of the peripheral unit 36 having the unit ID EQ-02 is "3" and the corresponding power receiving configuration flag FLG1 is "1", the steps S95 and S96 are carried out. More particularly, the step S95 makes the power supply unit 39 start receiving the power from the UPS 10d, and the step S96 changes the processing level to "4".

On the other hand, the processing level of the peripheral unit 41 having the unit ID EQ-04 is "5". Hence, the decision result in the step S97 is YES, and the step S98 starts receiving the supply of power from the UPS 10d which is included in the power supply system in which the power failure is restored, by controlling the corresponding power supply unit so as to supply the power to the units 30, 36 and 41 which were stopped from receiving the supply of power from the UPS 10d.

Next, a description will be given of an embodiment of a computer-readable storage medium according to the present invention.

This embodiment of the computer-readable storage medium is made up of a recording medium which stores a program (power supply control software) for causing a computer, such as the CPU 310 of the processing unit 30, to carry out the power supply control process, including the power failure process, the power restore process and the shut-down process described above. The computer-readable storage medium may be formed by a recording medium such as the hard disk of the HDD which forms the auxiliary storage 312 and stores the program described above. The recording medium forming the computer-readable storage medium according to the present invention is not limited to portable recording media, IC card memories, floppy disks, magneto-optical disks, CD-ROMs, but also includes various kinds of recording media which are accessible by a computer system which is connected via a communication means or a communication unit such as a modem and a LAN.

Therefore, the present invention can suppress unnecessary wear and/or average wear of the battery units within the UPSs, to efficiently control the supply of power in a computer system having units with different power receiving configurations such that a unit designed to receive power via a single UPS and a unit designed to receive power via a plurality of UPSs coexist in the computer system.

Further, the present invention is not limited to these embodiments, but various variations and modifications may be made without departing from the scope of the present invention.

What is claimed is:

1. An apparatus for controlling supply of power to an electronic device coupled thereto via a plurality of uninterrupted power supply units each receiving power from a corresponding external power source or including a battery unit, each of said uninterrupted power supply units outputting power failure information when no power is received from the corresponding power source, said apparatus comprising:

a first controller controlling input of power from the plurality of uninterrupted power supply units to the electronic device; and a second controller controlling said first controller in response to the power failure information received from at least one of the uninterrupted power supply units.

2. The apparatus as claimed in claim 1, wherein said second controller comprises a management table which stores information indicating power receiving configurations of a plurality of electronic devices coupled thereto and corresponding power failure information, and controls said first controller based on said information.

3. The apparatus as claimed in claim 1, wherein said second controller controls said first controller in response to power failure information received from at least one uninterrupted power supply unit so as to minimize wear of the battery unit in each of the uninterrupted power supply units.

4. The apparatus as claimed in claim 1, wherein said second controller controls said first controller in response to power failure information received from at least one uninterrupted power supply unit so as to average wear of the battery unit in each of the uninterrupted power supply units.

5. The apparatus as claimed in claim 2, wherein said management table stores a power failure flag corresponding to the power failure information from each of the uninterrupted power supply units with respect to each of the plurality of electronic devices which receive power via the uninterrupted power supply units, and said second controller updates the power failure flag stored in said management table in response to the power failure information.

6. The apparatus as claimed in claim 1, wherein the electronic device is made of a processing unit which forms a computer system together with other electronic devices coupled thereto, and said processing unit includes said first controller and said second controller.

7. An apparatus, for controlling supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, said apparatus comprising:

a first controller controlling input of power from the one or plurality of uninterrupted power supply units to the electronic device; and a second controller controlling said first controller in response to the power failure information received from at least one of the uninterrupted power supply units, wherein said second controller controls said first controller in response to power failure information received from an arbitrary uninterrupted power supply unit so as to stop the input of power from said arbitrary uninterrupted power supply unit to the electronic device which receives power via more than one uninterrupted power supply unit.

8. A method for controlling supply of power to an electronic device coupled thereto via a plurality of uninterrupted power supply units each receiving power from a corresponding external power source or including a battery unit, each of said uninterrupted power supply units outputting power failure information when no power is received from the corresponding power source, said method comprising the operation of:

(a) controlling input of power from the plurality of uninterrupted power supply units to the electronic device in response to the power failure information received from at least one of the uninterrupted power supply units.

9. The method as claimed in claim 8, wherein said operation (a) uses a management table which stores information indicating power receiving configurations of a plurality of electronic devices coupled thereto and corresponding power failure information, and controls the input of power from the plurality of uninterrupted power supply units to the units based on said information.

10. The method as claimed in claim 8, wherein said operation (a) controls the input of power from the plurality of uninterrupted power supply units to the electronic device in response to power failure information received from at least one uninterrupted power supply unit so as to minimize wear of the battery unit in each of the uninterrupted power supply units.

11. The method as claimed in claim 8, wherein said operation (a) controls the input of power from the plurality of uninterrupted power supply units to the electronic device in response to power failure information received from at least one uninterrupted power supply unit so as to average wear of the battery unit in each of the uninterrupted power supply units.

12. The method as claimed in claim 9, wherein said management table stores a power failure flag corresponding to the power failure information from each of the uninterrupted power supply units with respect to each of the plurality of electronic devices which receive power via the uninterrupted power supply units, and further comprising the operation of:

(b) updating the power failure flag stored in said management table in response to the power failure information.

13. A method, for controlling supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, said method comprising the operation of:

(a) controlling input of power from the one or plurality of uninterrupted power supply units to the electronic device in response to the power failure information received from at least one of the uninterrupted power supply units, wherein said operation (a) controls the input of power from the one or plurality of uninterrupted power supply units to the electronic device in response to power failure information received from an arbitrary uninterrupted power supply unit so as to stop the input of power from said arbitrary uninterrupted power supply unit to the electronic device which receives power via more than one uninterrupted power supply unit.

14. A computer-readable storage medium which stores a program for causing a computer to control supply of power to an electronic device coupled thereto via a plurality of uninterrupted power supply units each receiving power from a corresponding external power source or including a battery unit, each of said uninterrupted power supply units outputting power failure information when no power is received from the corresponding power source, said computer-readable storage medium comprising:

first means for causing the computer to control input of power from the plurality of uninterrupted power supply units to the electronic device; and second means for causing the computer to control said first means in response to the power failure information received from at least one of the uninterrupted power supply units.

15. The computer-readable storage medium as claimed in claim 14, wherein said second means causes the computer to use a management table which stores information indicating the power receiving configurations of a plurality of electronic devices coupled thereto and corresponding power failure information, and to control said first means based on said information.

16. The computer-readable storage medium as claimed in claim 14, wherein said second means causes the computer to control said first means in response to power failure information received from at least one uninterrupted power supply unit so as to minimize wear of the battery unit in each of the uninterrupted power supply units.

17. The computer-readable storage medium as claimed in claim 14, wherein said second means causes the computer to control said first means in response to power failure information received from at least one uninterrupted power supply unit so as to average wear of the battery unit in each of the uninterrupted power supply units.

18. The computer-readable storage medium as claimed in claim 15, wherein said management table stores a power failure flag corresponding to the power failure information from each of the uninterrupted power supply units with respect to each of the plurality of electronic devices which receive power via the uninterrupted power supply units, and said second means causes the computer to update the power failure flag stored in said management table in response to the power failure information.

19. A computer-readable storage medium, which stores a program for causing a computer to control supply of power to an electronic device coupled thereto via one or a plurality of uninterrupted power supply units each receiving power from a corresponding external power source or including a battery unit, each of said uninterrupted power supply units outputting power failure information when no power is received from the corresponding power source, said computer-readable storage medium comprising:

first means for causing the computer to control input of power from the one or plurality of uninterrupted power supply units to the electronic device; and second means for causing the computer to control said first means in response to the power failure information received from at least one of the uninterrupted power supply units, wherein said second means causes the computer to control said first means in response to power failure information received from an arbitrary uninterrupted power supply unit so as to stop the input of power from said arbitrary uninterrupted power supply unit to the electronic device which receives power via more than one uninterrupted power supply unit.

20. The apparatus as claimed in claim 2, wherein said management table further includes a processing level which indicates a level of a power supply control process which is to be carried out with respect to the electronic device.

* * * * *